Aug. 1, 1933.  J. A. PETERS  1,920,592
WHEEL HOLDING DEVICE
Filed May 31, 1932
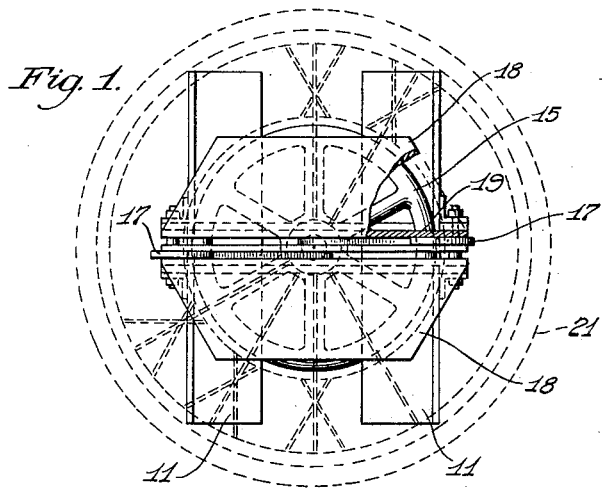
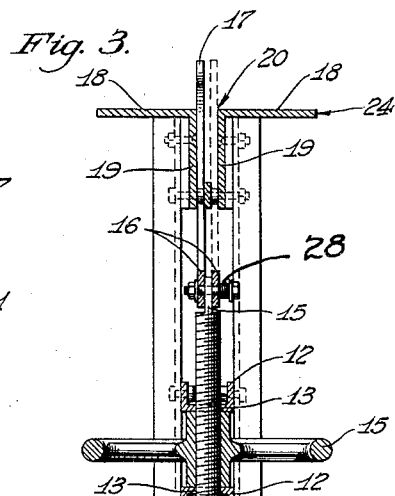
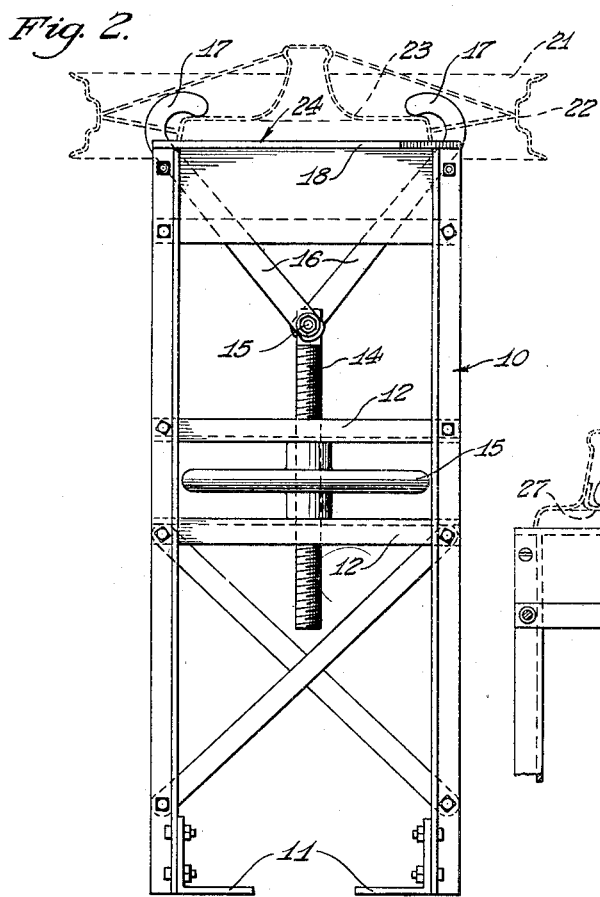
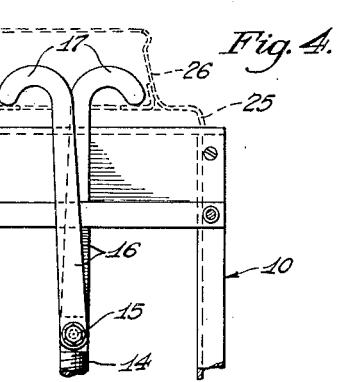
John A. Peters,
INVENTOR
BY Victor J. Evans & Co.
HIS ATTORNEYS Patented Aug. 1, 1933

1,920,592

UNITED STATES PATENT OFFICE 1,920,592

WHEEL HOLDING DEVICE

John A. Peters, Highland Park, Ill.

Application May 31, 1932. Serial No. 614,581

2 Claims. (Cl. 144—288)

This invention relates to certain novel improvements in wheel holding devices, and has for its principal object the provision of an improved construction of this character which will be highly efficient in use and economical in manufacture.

It is an object of this invention to provide an efficient, relatively simple, and inexpensive device to hold an automotive vehicle wheel relatively stationary so that the tire may be removed therefrom.

It is another object of the invention to provide a device that is especially adapted to hold an automotive vehicle wheel of the drop-center rim type relatively stationary during the tire-changing operation and without marring the appearance of the wheel or scraping the enamel therefrom.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a top plan view of a preferred form of the invention;

Fig. 2 is a side elevational view of the same;

Fig. 3 is a vertical sectional view of the device shown in Figs. 1 and 2; and

Fig. 4 is a fragmentary elevational view of the same.

In the drawing, which illustrates a preferred form of the invention, 10 generally indicates an upright frame which has base members or feet 11 that may be anchored to or in a suitable support. The frame 10 includes a pair of spaced members 12. Each of these members 12 is provided with an aperture 13 and extending through these apertures 13 is a screw 14 on which is threaded a hand wheel 15 that is arranged between the members 12; these members 12 serving as means for preventing vertical movement of the hand wheel 15.

Pivotally attached, as at 15, to the upper end of the screw 14 is a pair of clamping members 16 having hooked or angled end portions 17.

Attached to the upper end of frame 10 is a pair of plate members 18 which provide a wheel-supporting table, indicated generally at 24, and these members 18 have depending parallel flanges 19 which provide a vertical guideway 20 for the clamping members 16; said guideway opening at its upper end upon the upper surface of the table 24.

In Figs. 1 and 2 the device is shown as used with a wheel, generally indicated at 21, having the drop-center type of rim 22 and a hub flange of the type indicated at 23. In using the device with a wheel having the type of hub flange indicated at 23 the wheel 21 is arranged upon the table 24 so that the clamping members 16 project through the spaces between the spokes of the wheel. The hand wheel 15 is then rotated to clamp the hooked or angled end portions 17 of the clamping members 16 upon the hub flange 23 of the wheel 21 whereby to hold the wheel 21 securely in position upon the table 24 so that the tire may be removed from the rim 22 thereof. The wheel 21 may be removed from the table 24 by rotating the handwheel 15 to raise the screw 14 and spread the clamping members 16 so as to disengage the hooked or angled ends 17 thereof from the hub flange 23.

In Fig. 4 the clamping members 16 are shown as applied to the more common type of wheel 25 having a different type of hub than that shown on the wheel 21, and in using the device on wheels of this type the clamping members 16 are crossed over each other, scissors-like, and the hooked ends 17 thereof are clamped upon the internal bolt-receiving ring or flange 27 of the hub 26. In so using the device the clamping members 16 do not mar the appearance of the same nor scrape the enamel therefrom since in the use of the wheel 25 the internal bolt-receiving ring or flange 27 is concealed. Mounted on the pivotal connection 15 of the screw 14 to the clamping members 16 is a compression coil spring 28 which urges the clamping members 16 into vertical alignment in the guideway 20.

The device may, also, be used for holding disc wheels, old style wire wheels, demountable wood wheels, and truck disc wheels, the hooks 17 of the clamping members being placed either in the bolt holes or on the hub flange, as desired.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a wheel-holding appliance, the combination of a supporting-frame having a slotted horizontal table at its top, an upright screw, a rotatable hand-wheel threaded onto said screw, means carried by said frame for supporting said hand-wheel and holding it against vertical displacement while permitting rotation of the hand-wheel to feed the screw up or down, and a pair of wheel-clamping members having hook-shaped top ends extended up through the slot means of said table, said members being pivotally connected at their lower ends to said screw in offset relation to one another thereby permitting the upper hook ends of the members to pass by one another thus allowing both of said hook ends to face either inwardly toward one another or outwardly from one another.

2. In a wheel-holding appliance, the combination of a supporting-frame having a slotted horizontal table top, a member below said table top and adapted for up and down movement, means to move said member up and down, and a pair of wheel-clamping elements having hook-shaped top ends extended up through the slot means of said table top, said elements being pivotally connected at their lower ends to said member in offset relation to one another thereby permitting the upper hook ends of the members to pass by one another thus allowing both of said hook ends to face either inwardly toward one another or outwardly from one another.

JOHN A. PETERS.